US006717699B1

(12) United States Patent
Janssen et al.

(10) Patent No.: US 6,717,699 B1
(45) Date of Patent: Apr. 6, 2004

(54) METHOD FOR HYBRID PRINTING

(75) Inventors: Robert Allen Janssen, Alpharetta, GA (US); Frederick B. Noll, Roswell, GA (US); Mark Steven Sawchak, Roswell, GA (US); Kum Ming Nigel Woo, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/493,964

(22) Filed: Jan. 28, 2000

Related U.S. Application Data

(60) Provisional application No. 60/117,889, filed on Jan. 29, 1999.

(51) Int. Cl.[7] ........................ G06K 15/00; G06K 15/02; H04N 1/40

(52) U.S. Cl. ........................ 358/2.1; 358/1.9; 358/537; 382/211; 382/173; 382/176; 399/49

(58) Field of Search ........................ 358/1.9, 2.1, 504; 254/523; 382/211; 347/24; 399/49

(56) References Cited

U.S. PATENT DOCUMENTS

| | | | | |
|---|---|---|---|---|
| 4,664,815 A | | 5/1987 | Ozawa et al. | |
| 4,802,989 A | | 2/1989 | Haruta et al. | |
| 5,049,898 A | | 9/1991 | Arthur et al. | |
| 5,289,210 A | | 2/1994 | Takayanagi | |
| 5,311,334 A | * | 5/1994 | Sugiura | 358/537 |
| 5,710,582 A | | 1/1998 | Hawkins et al. | |
| 5,713,062 A | * | 1/1998 | Goodman et al. | 399/49 |
| 5,847,729 A | | 12/1998 | Takahashi et al. | |
| 5,898,451 A | | 4/1999 | Kaplinsky et al. | 347/87 |
| 6,226,103 B1 | * | 5/2001 | Klassen et al. | 358/1.9 |

FOREIGN PATENT DOCUMENTS

| | | | |
|---|---|---|---|
| EP | 0 181 225 A2 | 5/1986 | |
| EP | 0 181 226 A2 | 5/1986 | |
| EP | 0 526 012 A2 | 2/1993 | |
| EP | 0 602 914 A1 | 6/1994 | |
| EP | 0 640 479 A1 | 3/1995 | |
| EP | 0 694 407 A2 | 1/1996 | |
| EP | 0694407 A2 * | 1/1996 | B41J/2/21 |

(List continued on next page.)

OTHER PUBLICATIONS

Michaels, Stephen L.; *Crossflow Microfilters: The Ins And Outs*; McGraw–Hill, Inc.,Jan. 1989, pp. 1–2.

(List continued on next page.)

*Primary Examiner*—Edward Coles
*Assistant Examiner*—David L Jones
(74) *Attorney, Agent, or Firm*—Steven D. Flack

(57) ABSTRACT

The present invention relates to a system and method for ink-jet printing. More specifically, the present invention is directed to a system and method useful for ink-jet printing onto textiles. Even more specifically, the present invention is directed to ink-jet printing onto textiles using spot color, process color and hybrid color printing modes. The present invention uses normal textile dyes, purifies these dyes, and then formulates the dyes into stock solutions which, when combined with specific additives, are capable of being used in an ink-jet printing process. The purified stock solutions are shipped in specially designed containers to a color kitchen wherein software is used to analyze the pattern of the textile to be printed and determines which stock solutions and combinations of stock solutions and additives will be needed to reproduce the desired pattern. Next, the selected stock solutions and additives are dispensed into specially designed containers that are capable of being used directly in a standard ink-jet printing system. Next, depending on the pattern to be printed, the number of colors required, and the number of colors available that can be printed by the ink-jet printing system, software is used to ink-jet print the inks onto a textile in the preselected pattern. The printing is accomplished using a spot color, process color or hybrid color printing mode.

21 Claims, 8 Drawing Sheets

FOREIGN PATENT DOCUMENTS

| | | | |
|---|---|---|---|
| EP | 0 790 347 | A2 | 8/1997 |
| EP | 0 802 246 | A1 | 10/1997 |
| GB | 2 168 368 | A | 6/1986 |
| JP | 60072962 | | 4/1985 |
| JP | J62243890 | | 4/1986 |
| JP | 05339869 | | 12/1993 |
| WO | WO 96/34758 | | 11/1996 |

OTHER PUBLICATIONS

Pall Corporation; *Selection Guide Profile II–Pcol Series Single Stack Housings*; 1991; pp. 1–4.

GSE Dispensing In; *Computerrized Gravimetric Ink Dispension System*; pp. 1–2.

* cited by examiner

METHOD FOR HYBRID PRINTING

CROSS-REFERENCE TO RELATED APPLICATION

This application claims priority to U.S. Provisional Patent Application Serial No. 60/117,889, filed Jan. 29, 1999.

FIELD OF THE INVENTION

The present invention is generally in the field of digital printing systems. More specifically, the present invention relates to a system and method useful for ink-jet printing onto substrates. The present invention is directed to ink-jet printing onto textiles and other materials printed in an industrial environment using spot color, process color and hybrid color printing modes.

BACKGROUND OF THE INVENTION

Textiles having a printed pattern thereon are used in many different items. Clothing, fabrics for furniture upholstery, automotive upholstery, window treatments, and bedroom furnishings, such as bedspreads, sheets and pillow cases, are just a few of the uses for these textiles. In addition to textiles, other materials have used printed patterns, such as wall coverings, floor coverings and signage. These patterns on the printed textiles and other materials may include many different colors, several of which may be very vivid and striking.

Typically, these printed textiles are produced using standard printing presses. After determining the colors to be used, screens or other mechanical forms are made for each color and these mechanical forms are placed in the press. Next, a fabric is placed on the press and colorants are added to the press. The press then applies the colorants onto the fabric via the mechanical forms to produce the desired pattern.

Generally, the fixed costs for preparing the screens or other mechanical forms and setting up the presses are spread over long production runs for the textile or other material being printed and are therefore, very reasonable on a per yard basis. Therefore, the technology used to make these printed textiles has changed very little over the years. However, these fixed costs can be very high. If only small quantities of the printed textile or other material are produced, the cost per yard produced can be very expensive. However, smaller quantities are needed when producing a variety of different colored samples and patterns to help with market assessment of the desired pattern. Since not all designed patterns are accepted by the market, print producers have had an aversion to preparing pre-production samples of very many patterns. Additionally, the time needed to change from one colored pattern to another is extensive.

Therefore, there is a need for a system and process which is capable of producing printed textiles which significantly reduces the fixed costs and preparation time, thereby allowing a plurality of samples to be produced in an inexpensive manner and to be produced on a just-in-time basis.

Digital color printing is one possible alternative for low cost production of textile samples. Digital color printing of documents has been known for some time. Digital color printers, including ink-jet printing systems, are widely used in many different fields to produce documents and presentations having the added benefit of color. However, due to the limited number of color cartridges that may be used in a digital printer, typically four to eight, current printers are limited in the colors they can recreate. To enhance the number of printable colors, current digital color printers use a "process color" method when printing to expand upon the colors in the color cartridges.

In a "process color" method, the digital color printer uses "process colors," in which either three (cyan, magenta and yellow) or four (plus black) primary ink colors which comprise a process color set. These primary ink colors are commonly referred to by their initials C, M, Y and K, respectively. In addition, other process color sets, such as (C, M, Y, K, green, and orange) or (C, M, Y, K, light cyan, and light magenta), are known in the art. Generally, the process colors in a process color set are used to produce a wide range of printed colors by combining various amounts of each of the process colors in the form of adjacent or superimposed dots. C, M and Y are subtractive primary ink colors and may be combined to form most other ink colors.

Spot color printing involves application of solid areas of pre-mixed ink rather than overlapping multiple inks (C, M, Y and K) to create colors. For example, the deposition of an ink having the pre-mixed color of IBM® blue onto a substrate would be a spot color process.

The range of possible colors that may be printed by a printing process is referred to as the "gamut" of the process. Unfortunately, the gamut of most printing processes is much smaller than the total range of colors that can be seen. Specifically, the gamut of process color printers is smaller than the possible gamuts produced by traditional printing presses, such as offset, flexographic, gravure and screen printing presses, which print with pre-mixed or "spot" color inks. In other words, ink-jet printing systems relying on process color techniques cannot produce colors that match exactly many of the desired colors (i.e., IBM® blue, Coca-Cola® red or colors designed by fashion designers and produced by specific textiles dyes or pigments) one sees in everyday life. Therefore, ink-jet printing systems are not able to reproduce many of the vivid and striking colors currently seen on most textile patterns. As various industries, such as the textile industry, begin to transition from traditional press technology to digital printing technology, the restricted color gamut of process color devices will dampen the rate of adoption of digital printing.

Therefore, what is needed is a combination of spot color printing with digital printing which will provide the same color gamut expected by the users of traditional presses as well the benefits that are inherent to digital printing, such as short run printing, just-in-time production, and distributed printing, among others.

SUMMARY OF THE INVENTION

The present invention provides a system and method for digital printing which is useful for ink-jet printing onto various substrates. Even more specifically, the present invention is directed to inkjet printing onto textiles using a spot color printing mode, a process color printing mode, and/or a hybrid of both spot and process color printing modes. The present invention uses standard colorants, including textile dyes and pigments, thereby allowing the system to be used in existing manufacturing plants. As used herein, the term "dye" is meant to include all dyes and pigments. Next, the present invention includes methods of formulating ink-jet inks wherein these dyes are purified using a system specifically designed to selectively remove unwanted impurities, such as particulates, dissolved molecules, and ions, from the dyes and to formulate these dyes into inks capable of being used in an ink-jet printing process.

After the dyes have been purified, they are placed into and shipped in specially designed containers to a color kitchen, which may be located at the manufacturing plant. The containers are designed to not only prevent impurities, including air, from entering the container and to prevent expiration of water from within, but also such that they may be easily connected to the color kitchen. The color kitchen is designed to mix the purified dye stock solutions with water and optionally other additives to form the inks needed to reproduce a particular color, i.e., a spot color.

The determination of the colors to be used is performed using a recipe creation software which analyzes the colors to be printed and selects which formulations of dyes should be mixed together to form the colors needed to reproduce the selected colors in the pattern to be printed. Next, the color kitchen dispenses the appropriate purified dye stock solutions, generates the selected ink-jet ink formulations into specially designed containers or ink jet cartridges. These containers are preferably designed to include a removable connector that allows the color kitchen to dispense the purified dye stock solutions, water and additives into the container.

The same connector, when attached to these containers allows the container to be used directly in an ink-jet printing system. Additionally, the containers are preferably designed to ensure that no impurities are able to get into the dispensed inks and therefore clog the ink-jet printing system nozzles or destabilize the inks.

In general, because ink-jet printing systems currently print with no more than 6 to 8 colors, and because many printed textiles have patterns containing more than eight colors, the present invention also includes a hybrid color management software which directs the printer to use a spot color process to exactly reproduce some colors of the desired pattern while using a process color process to reproduce the remaining, less important colors of the pattern, thereby allowing the reproduction of a printed textile using a digital printing process.

Therefore, the present invention is capable of digitally printing a pattern onto a substrate using standard printing dyes. The present invention also provides a filtration system which is capable of purifying standard printing dyes into stable solutions that can be used in a color kitchen. Additionally, the present invention includes containers which are designed to transport purified dyes solutions or pigment dispersions to a color kitchen without impurities entering the container while also permitting the dyes to be introduced into the color kitchen. The present invention provides a color kitchen which mixes the purified dye solutions into the necessary colors as determined using a recipe creation software program. Additionally, the present invention provides a second container which is adaptable to fit onto the color kitchen while also being adaptable to fit onto an ink-jet printing system. Finally, the present invention is capable of using both a spot color printing mode and a process color printing mode to reproduce a desired printed pattern on a textile and digitally printing that pattern onto a textile to produce more pattern colors than there are ink colors on the printing system.

These and other features and advantages of the present invention will become apparent after a review of the following detailed description of the invention.

DETAILED DESCRIPTION

The present invention provides a system and method for using digital printing technology to print patterns onto textiles and other materials, which heretofore could only be generated using standard printing presses. The system includes a plurality of different features, each of which is an important part of the overall system.

Figure 1A:
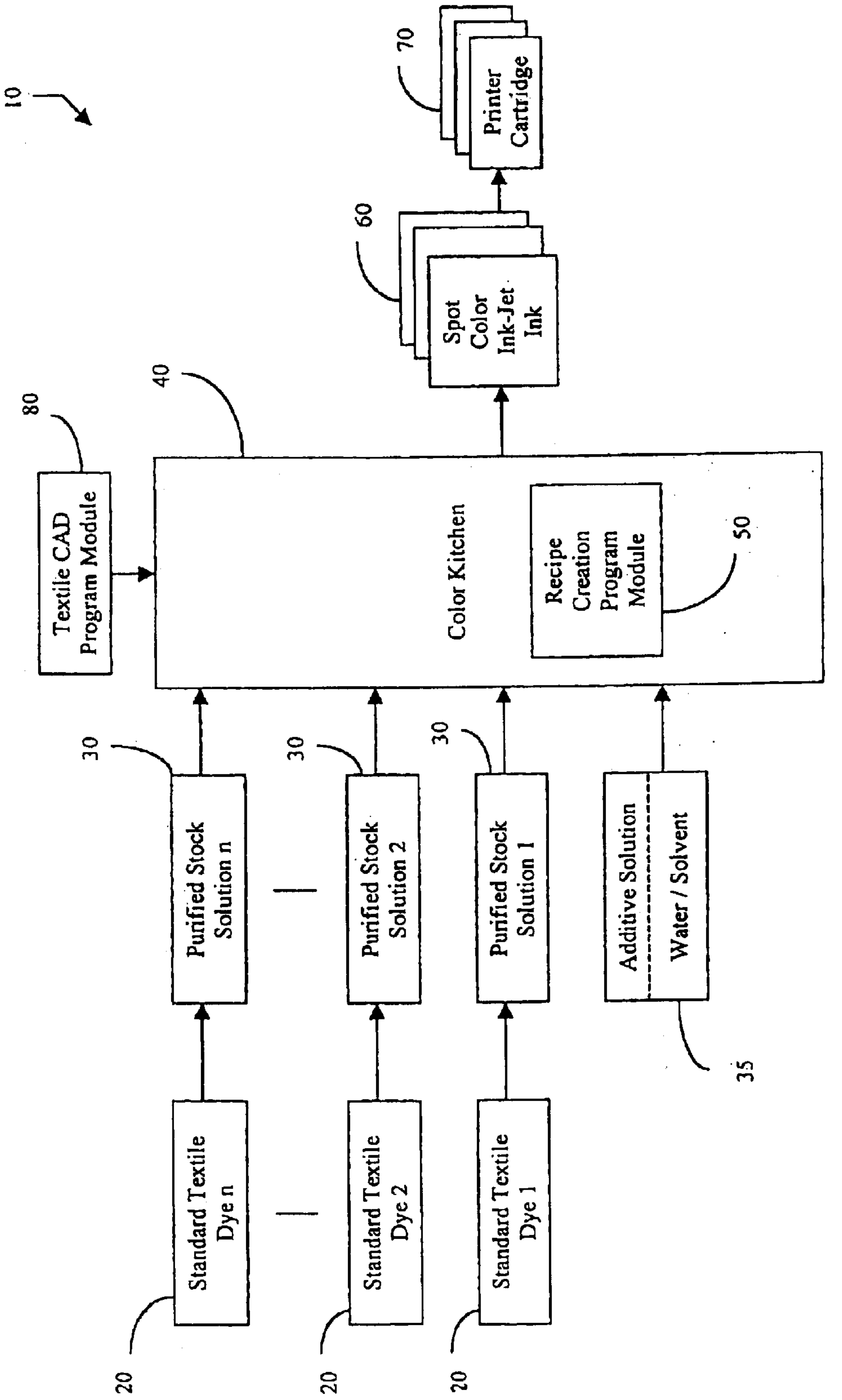
FIG. 1*a* is a functional block diagram illustrating a system of the present invention wherein dyes are purified, mixed and dispensed into containers capable of acting as printer cartridges for an ink-jet printing system.
Figure 1B:
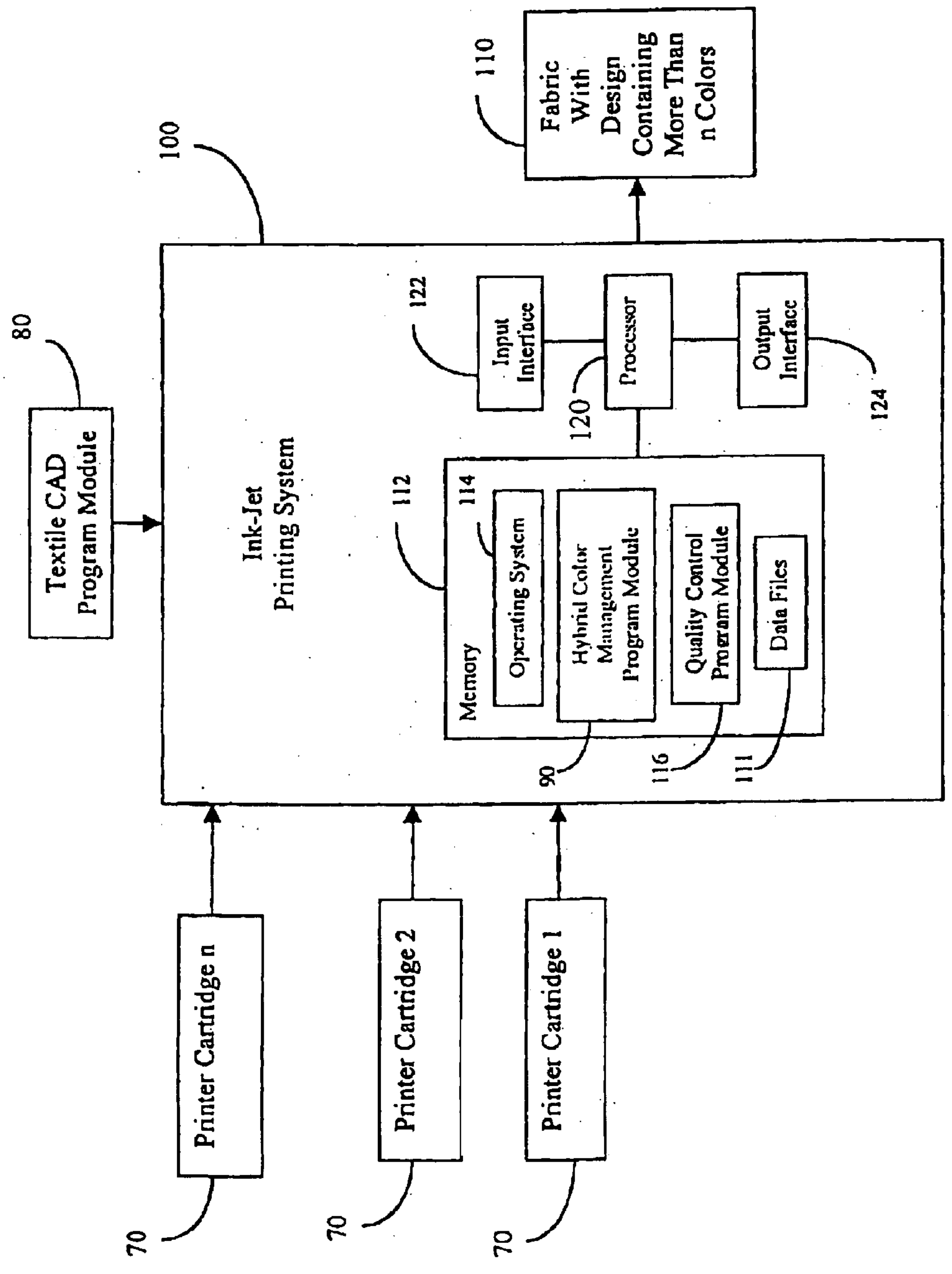
FIG. 1*b* is a functional block diagram illustrating a system of the present invention wherein printer cartridges are inserted into an inkjet printing system for digitally printing a pattern onto a substrate.

As shown in FIGS. 1*a* and 1*b*, the first part of the present invention comprises a method and apparatus 10 for purifying dyes such that they are able to be used in a digital printing system, such as an inkjet printing system 100. It is desirable to use known textile colorants 20 in the present invention since, as discussed above, one of the uses for this system is for economically producing samples of many different types of printed textiles. The standard colorants 20 are purified and formulated into purified stock dye solutions or pigment dispersions 30 using a purification system. By using standard colorants 20, a textile printing company can use the same colorants 20 for both ink-jet printing, which would include proof sampling and short run production, and on-press production printing. This eliminates the need for sourcing expensive specialty dyes, which may not accurately reflect the color of the textile dye, thereby creating discrepancies between the sample produced and the large production run.

The next part of the system comprises the means by which the purified stock dye solutions 30 are transported to the textile manufacturing plant without contamination of these solutions 30. While it is contemplated that the dyes will be purified ex situ, it is possible for the purification system to be located in situ. However, in most instances, after the dyes have been purified into purified stock dye solutions 30, it is desired to ensure that contamination does not occur between the purification site and the manufacturing site. By using containers designed to prevent contamination, the present invention helps ensure that the solutions will be able to be used in an ink-jet printing system. Additionally, the containers are preferably designed such that the purified dye can be withdrawn from the container and added to a color kitchen, to be discussed hereafter, without contamination of the solution.

Once the purified dye stock solutions 30 have been loaded into the color kitchen 40, they can be formulated into inks that can be used in an ink-jet printing system 100. As used herein, the term "color kitchen" is defined as a system designed to mix one or more purified dye stock solutions or dispersions with additives and either water or a solvent to form an ink capable of being used in an ink-jet printer.

While the color kitchen 40 may be located ex situ, it is contemplated that each manufacturing plant incorporating the present system will have its own color kitchen 40. This allows production of ink-jet inks having short-term stability, unlike typical ink-jet inks, which have shelf-lives of 6 months or longer. This "just-in-time" ink production helps to significantly reduce ink development time and cost, thus making the development of inks utilizing hundreds of different colorants feasible. The color kitchen 40 takes the purified dye solutions 30 and mixes them with water and other additives 35 to form the inks to be used by the ink-jet printing system 100. These ink-jet ink sets 60 are dispensed by the color kitchen 40 into containers 70, which are then sealed. These containers 70 may be specially designed containers which may also be installed directly onto the ink-jet printing system 100.

The colors of the inks to be produced in the color kitchen 40 are determined using a recipe creation program module 50 which analyzes the colors to be produced and determines which mixture of dyes will be needed. Additionally, if the pattern or design to be printed has more design colors than the ink-jet printing system 100 has ink colors, then a Hybrid Color Management program module 90 may be used to invoke a hybrid printing mode. In a hybrid printing mode, a hybrid color set comprising spot colors and process colors is loaded into the ink-jet printing system 100. The spot colors are used to print selected design colors in a spot color mode, while the process colors are used in combination with themselves and/or with the spot colors to print other design colors in a process color mode. Finally, a textile CAD program module 80 may be used to provide input data to the color kitchen 40 and the ink-jet printing system 100.

The first part of the system and process of the present invention is the purification of standard dyes. Typically, standard dyes have impurities within the dye which prevent these dyes from being used directly in a digital printing system, such as an ink-jet printing system. Custom purification is therefore usually required to allow the standard dyes to be used in a digital printing system. The purification removes from the dye both inorganic and organic materials that prove detrimental to ink stability and ink performance in both the printing head and print quality.

The standard colorants that may be used in the present invention preferably have a low viscosity (1 to 20 cps) and may be reactive dyes, acid dyes, VAT dyes, dispersed dyes or pigments. However, the dyes are preferably reactive dyes.

Reactive dyes useful in the present invention include, but are not limited to, CI Reactive Yellow 7, CI Reactive Yellow 18, CI Reactive Yellow 22, CI Reactive Yellow 55, CI Reactive Yellow 86, CI Reactive Orange 4, CI Reactive Orange 12, CI Reactive Orange 13, CI Reactive Orange 35, CI Reactive Orange 66, CI Reactive Red 2, CI Reactive Red 3, CI Reactive Red 5, CI Reactive Red 6, CI Reactive Red 11, CI Reactive Red 31, CI Reactive Green 8, CI Reactive Blue 4, CI Reactive Blue 5, CI Reactive Blue 9, CI Reactive Blue 13, CI Reactive Blue 49, CI Reactive Blue 63, CI Reactive Blue 71, CI Reactive Blue 72, CI Reactive Blue 62, CI Reactive Blue 96, CI Reactive Blue 99, CI Reactive Blue 109, CI Reactive Blue 122, CI Reactive Blue 140, CI Reactive Blue 161, CI Reactive Blue 162, CI Reactive Blue 163, CI Reactive Blue 166, CI Reactive Blue 198, CI Reactive Violet 1, CI Reactive Brown 9, CI Reactive Brown 10, CI Reactive Brown 17, CI Reactive Brown 22, CI Reactive Brown 23, CI Reactive Black 8, and CI Reactive Black 14.

Acid dyes useful in the present invention include, but are not limited to, CI Acid Yellow 3, CI Acid Yellow 5, CI Acid Yellow 23, CI Acid Yellow 36, CI Acid Yellow 73, CI Acid Yellow 210, CI Acid Orange 7, CI Acid Orange 8, CI Acid Orange 60, CI Acid Orange 63, CI Acid Orange 142, CI Acid Red 52, CI Acid Red 87, CI Acid Red 357, CI Acid Green 1, CI Acid Green 26, CI Acid Blue 9, CI Acid Blue 254, CI Acid Violet 90, CI Acid Brown 26, CI Acid Brown 268, CI Acid Brown 269, CI Acid Black 194, and CI Acid Black 210.

VAT dyes useful in the present invention include, but are not limited to, CI Vat Yellow 4, CI Vat Blue 1, CI Vat Brown, CI Solubilized Vat Yellow 2, CI Solubilized Vat Yellow 4, CI Solubilized Vat Yellow 45, CI Solubilized Vat Orange 1, CI Solubilized Vat Orange 5, CI Solubilized Vat Orange 11, CI Solubilized Vat Red 1, CI Solubilized Vat Red 2, CI Solubilized Vat Red 10, CI Solubilized Vat Green 1, CI Solubilized Vat Green 30, CI Solubilized Vat Blue 1, CI Solubilized Vat Blue 2, CI Solubilized Vat Blue 5, CI Solubilized Vat Blue 6, CI Solubilized Vat Violet 2, CI Solubilized Vat Violet 3, CI Solubilized Vat Violet 8, CI Solubilized Vat Brown 1, CI Solubilized Vat Black 1, CI Solubilized Vat Black 2, and CI Solubilized Vat Black 25.

Dispersed dyes useful in the present invention include, but are not limited to, CI Disperse Yellow 3, CI Disperse Yellow 23, CI Disperse Yellow 42, CI Disperse Yellow 54, CI Disperse Yellow 82, CI Disperse Yellow 86, CI Disperse Yellow 119, CI Disperse Yellow 238, CI Disperse Yellow 239, CI Disperse Orange 1, CI Disperse Orange 3, CI Disperse Orange 25, CI Disperse Orange 153, CI Disperse Red 1, CI Disperse Red 4, CI Disperse Red 9, CI Disperse Red 13, CI Disperse Red 11, CI Disperse Red 60, CI Disperse Red 167, CI Disperse Red 364, CI Disperse Red 375, CI Disperse Blue 3, CI Disperse Blue 14, CI Disperse Blue 56, CI Disperse Blue 60, CI Disperse Blue 72, CI Disperse Blue 79, CI Disperse Blue 134, CI Disperse Blue 160, CI Disperse Blue 359, CI Disperse Blue 360, CI Disperse Violet 1, CI Disperse Violet 17, CI Disperse Violet 105, CI Disperse Brown 28 and CI Disperse Brown 27.

Pigments useful in the present invention include, but are not limited to, CI Pigment Yellow 1, CI Pigment Yellow 3, CI Pigment Yellow 14, CI Pigment Yellow 17, CI Pigment Yellow 83, CI Pigment Yellow 101, CI Pigment Yellow 1110, CI Pigment Yellow 185, CI Pigment Orange 13, CI Pigment Orange 16, CI Pigment Orange 49, CI Pigment Red 48, CI Pigment Red 49, CI Pigment Red 57, CI Pigment Red 81, CI Pigment Red 112, CI Pigment Red 122, CI Pigment Red 146, CI Pigment Red 150, CI Pigment Red 170, CI Pigment Red 202, CI Pigment Red 206, CI Pigment Red 207, CI Pigment Green 7, CI Pigment Green 36, CI Pigment Blue 15, CI Pigment Blue 15.1, CI Pigment Blue 15.3, CI Pigment Blue 61, CI Pigment Violet 19, CI Pigment Violet 42, CI Pigment Black 7, and CI Pigment Black 31.

Examples of other dyes that may be used in the present invention include, but are not limited to, CI Ingrain Blue 2, CI Ingrain Blue 5, CI Ingrain Blue 14, triarylmethyl dyes, such as Malachite Green Carbinol base {4-(dimethylamino)-__-[4-(dimethylamino)phenyl]-__-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p(dimethylamino)phenyl]phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethylamino)-phenyl]phenyl-methylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis (dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazino-carbonyl)amino]-2, 3-dihydro-1,3-dioxo-1H-benz[de]iso-quinoline-5,8-disulfonic acid dilithium salt}; azine dyes, such as Janus Green B {3-(diethylamino)-7-[[4(dimethyl-amino)phenyl] azo]-5-phenylphenazinium chloride }; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxy-benzene diazonium chloride, zinc chloride double salt); phenylenediamine dyes, such as Disperse Yellow 9 [N-(2, 4-dinitrophenyl)-1,4-phenylenediamine or Solvent Orange 53]; diazo dyes, such as Disperse Orange 13 [Solvent Orange 52; 1-phenylazo-4-(4-hydroxyphenylazo) naphthalene]; anthra-quinone dyes, such as Disperse Blue 3 [Celliton Fast Blue FFR; 1-methylamino-4-(2-hydroxyethylaniino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diarninoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)-$N^{29}$, $N^{30}$,$N^{31}$,$N^{32}$]copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine). Other examples of dyes include leuco dyes such as aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leucomethines), hydrazines, leuco indigoid dyes, amino-2, 3-dihydroanthraquinones, phenethylanilines, 10-acyl-aminodihydrophenazines, 10-acyl-aminophenothiazines, 10-acyl-aminophenoxazines and arninotriarylmethanes wherein the methane hydrogen has been replaced by an alkylthio, benzylthio, 2-phenylhydrazino, or alkoxycarbonyl group.

Once the dyes have been selected, they are then purified and formulated into purified dye stock solutions. These purified dye stock solutions are formed by using a purification system designed to remove the undesirable contaminants. However, some of the impurities located within a dye are beneficial, such as salts which are used as pH buffers, so the purification system is preferably designed to remove only those impurities which adversely affect the quality of the purified dye stock solution. After the impurities are removed, the dyes are formulated into purified dye stock solutions by mixing the purified dyes with water and specially selected buffer materials to keep the solutions stable prior to being formed into ink-jet inks.

In general, there are several different types of purification systems that may be used to remove the impurities. Examples of purification systems include filtration, ion exchange, precipitation, electrodialysis, and centrifugation. However, the preferred purification system is a filtration system.

There are several filtration methods that may be used with the present invention, including, but not limited to, cross-flow filtration and throughflow filtration, of which the preferred method is crossflow filtration. Both methods can be used to separate different types of species, ranging from large particles to small molecules and ions. The type of species to be separated determines the type of membrane system to be used. These membrane systems include, but are not limited to, microfiltration, ultrafiltration, nanofiltration, and reverse osmosis. Because dye molecules are mid-sized molecules (molecular weight of about 500), it is preferred to select a filtration system that can remove both large particles and small molecules. Moreover, because not all of the impurities in a dye are detrimental to its performance as an ink, the system should be capable of removing certain impurities, and leaving the beneficial ones behind. Finally, it is desirable to select a filtration system that will minimize the risk of clogging and degradation of the membrane. For these reasons, the preferred filtration system is a crossflow membrane filtration system.

Figure 2:
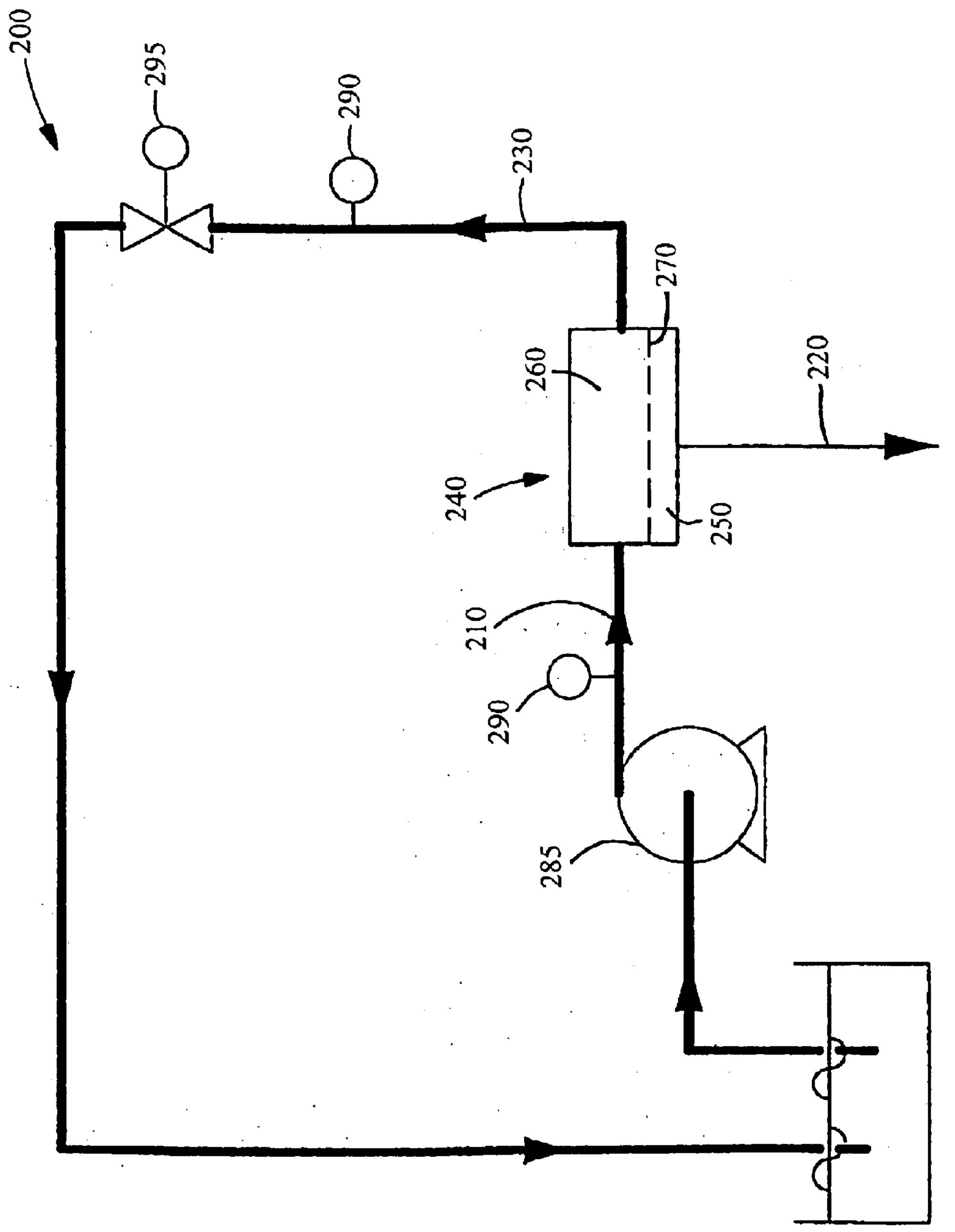
FIG. 2 shows an exemplary embodiment of a purification system useful in the present invention.

As shown in FIG. 2, in a cross-flow membrane filtration system 200, the dye undergoes a two step process. In the first step, a membrane 270 is chosen which uses size exclusion to remove the larger impurities. In the second step, a different membrane 270 is chosen which is capable of removing the smaller sized impurities.

The cross-flow membrane filtration system 200 comprises a dye inlet 210, a first outlet 220, and a recirculation outlet 230. The system 200 also includes a cross-flow filtration area 240 which includes a lower plate 250 and an upper plate 260 which sandwich the membrane 270. Bolts or other fastening means are used to ensure that the membrane 270 remains in place during the filtration step since the dyes are usually filtered at elevated speeds and pressures, which create significant forces upon the membrane 270. Additionally, a pump 285, pressure gauges 290 and pressure regulating valves 295 may be used to control flow of the fluids through the system 200.

The output from the first outlet 220 and the recirculation outlet 230 will change depending upon which filtration step is occurring. During the first filtration step, the larger particles are trapped by the membrane 270 and are recirculated to the recirculation outlet 230 where they are removed. The partially purified dye and smaller particles pass through the membrane 270 and out through the first outlet 220. In the second filtration step, a second membrane 270 is used which has a different pore size and selectivity characteristics. During this step, the smaller impurities and water pass through the membrane 270 and exit the system 200 through the first outlet 220. The impurity laden water that has exited the system is replaced with clean distilled water. The addition of clean water to replace impure water is typically known as diafiltration. Purified dye is trapped by the membrane 270 and passes through to the recirculation outlet 230 along with the clean water, where it is collected in a container (not shown) and mixed with water and buffers to produce the purified dye stock solution. If the purification is performed off-site and the color kitchen 40 is located at the textile manufacturing plant, then the stock solutions need to be transported to the color kitchen 40. Preferably, the containers used are designed to help prevent contamination of the purified stock solutions during transport. In general, it is desired to keep air out of the containers and keep water from expiring from the purified stock solution.

Alternatively, the filtration apparatus may be designed such that the two different membranes 270 are arranged in series, which the larger pore size membrane located in the first position. The filtration apparatus would then include three outlets. Materials not passing through the first membrane would be discarded through the first outlet as these materials would comprise the larger impurities. Materials passing through the second membrane would be discarded through the third outlet as comprising the smaller impurities. The purified dyes would be removed from the second outlet.

The membranes 270 used are mainly chosen based upon their pore size. However, the membranes 270 are also preferably able to be modified, such as by pH adjustment, to selectively keep or remove only some of the impurities, thereby allowing the beneficial impurities to remain in the dye solution. Preferably, the microfiltration membranes used for crossflow filtration are SUPOR™ membranes. They are polyethersulfone membranes manufactured by Gelman Sciences in Ann Arbor, Mich., and are distributed by VWR Scientific Products. The pore size of the microfiltration membranes is 0.2 μm.

Additionally, the ultrafiltration membranes currently used for crossflow filtration may be obtained from Sepratech in Rock Hill, S.C. and are listed under the designations G5, G10, and G20. They are thin film composite membranes. The membrane is composed of two layers: a thin film of membrane at the top which is responsible for the actual separation, and a comparatively thicker layer of backing material at the bottom which provides support. The G5, G10, and G20 membranes are rated at different molecular weight cutoffs. However, it must be kept in mind that molecular weight cutoffs should be used as guidelines and not as absolute boundaries; the G5 will have the lowest amount of passage and the G20 will have the highest amount of passage, but the specific molecules that would pass through the membranes can only be determined by experiment. It has been determined that a large percentage (95–99%) of dye molecules are retained by these particular membranes.

After the standard dyes have been purified and formulated into purified stock solutions, these solutions are dispensed into containers and shipped to sites that have color kitchens 40. Additionally, the additives 35 needed to be mixed with the purified stock solutions 30 are also shipped to the sites that have a color kitchen 40. The purified stock solutions 30 and the additives 35 are combined in the color kitchen 40 to form ink-jet inks. Process color ink-jet inks are generally purchased as standard off-the-shelf items.

The present invention also includes specially designed containers which are capable of preventing contamination and water expiration during shipment, but also allow for ready dispensing of the stock solutions into the color kitchen 40 without significant risk of decontamination.

These specially designed containers may be any shape or size as long as they prevent contamination of the purified stock solutions and additives. While the containers may be rigid, preferably they comprise collapsible bags made from a material that is substantially impervious to air contaminants and moisture. Materials suitable for this purpose include, but are nor limited to, plastics and/or foils. Preferably, the material for the bags comprises a laminate including at least one foil layer. Foils may be used to not only provide a substantially impervious layer to air, other gasses and moisture, but the foil also helps eliminate light, which might degrade the purified dye stock solutions.

Additionally, the containers include a specially designed fitting which serves two purposes. The first is the introduction of the solutions into the container in a manner which prevents contamination of the just-purified dye stock solution. Therefore, the fitting is preferably designed to be connected with the purification apparatus outlet such that after purification, the dye stock solutions are immediately dispensed into the container and sealed. The containers are then shipped to the color kitchen 40. As further described below, a typical color kitchen 40 includes a plurality of reservoir tanks which hold the different purified dye stock solutions 30 and additives 35. Therefore, the container fittings must also be capable of dispensing the purified dye stock solutions 35 into their respective reservoir tank without contamination.

One feature of the present invention is the on-demand, on-site formulation of final ink-jet inks. This will provide quick and efficient preparation of ink-jet formulations for colors needed to print specific designs. The purified dye stock solutions 30, additives and water 35 may be mixed in any proportion to produce the desired ink color. This is accomplished using a color kitchen 40. Color kitchens are currently used in the production of conventional printing inks and pastes. However, heretofore, these color kitchens have not been made commercially available to produce ink-jet inks, which contain various additives not normally associated with conventional inks and pastes. Ink-jet additives, which may include, but are not limited to, a solution in water or a base solvent containing co-solvents, surfactants, viscosity modifiers, biocides, corrosion inhibitors, resins, and/or buffers may then be dispensed with the stock dye solution to provide a final ink having ink-jettable characteristics. An additional advantage of this just-in-time ink production method is that the final ink requires only short term stability.

The final ink may be placed into a specially designed ink container or reservoir and capped. As will be discussed in more detail below, the specially designed ink container preferably comprises a collapsible plastic pouch into which the color kitchen 40 dispenses purified dye stock solutions 30, additives and water or solvent 35, depending upon the type of dye being used. Additionally, the containers may also be used as ink feed reservoirs for the ink-jet printing system 100. These containers also minimize the amount of air contacting the final ink, and thereby minimize the risk of contamination from air-borne particulates. Therefore, the color kitchen 40 is preferably designed to be able to be used with these unique ink containers.

Figure 3:
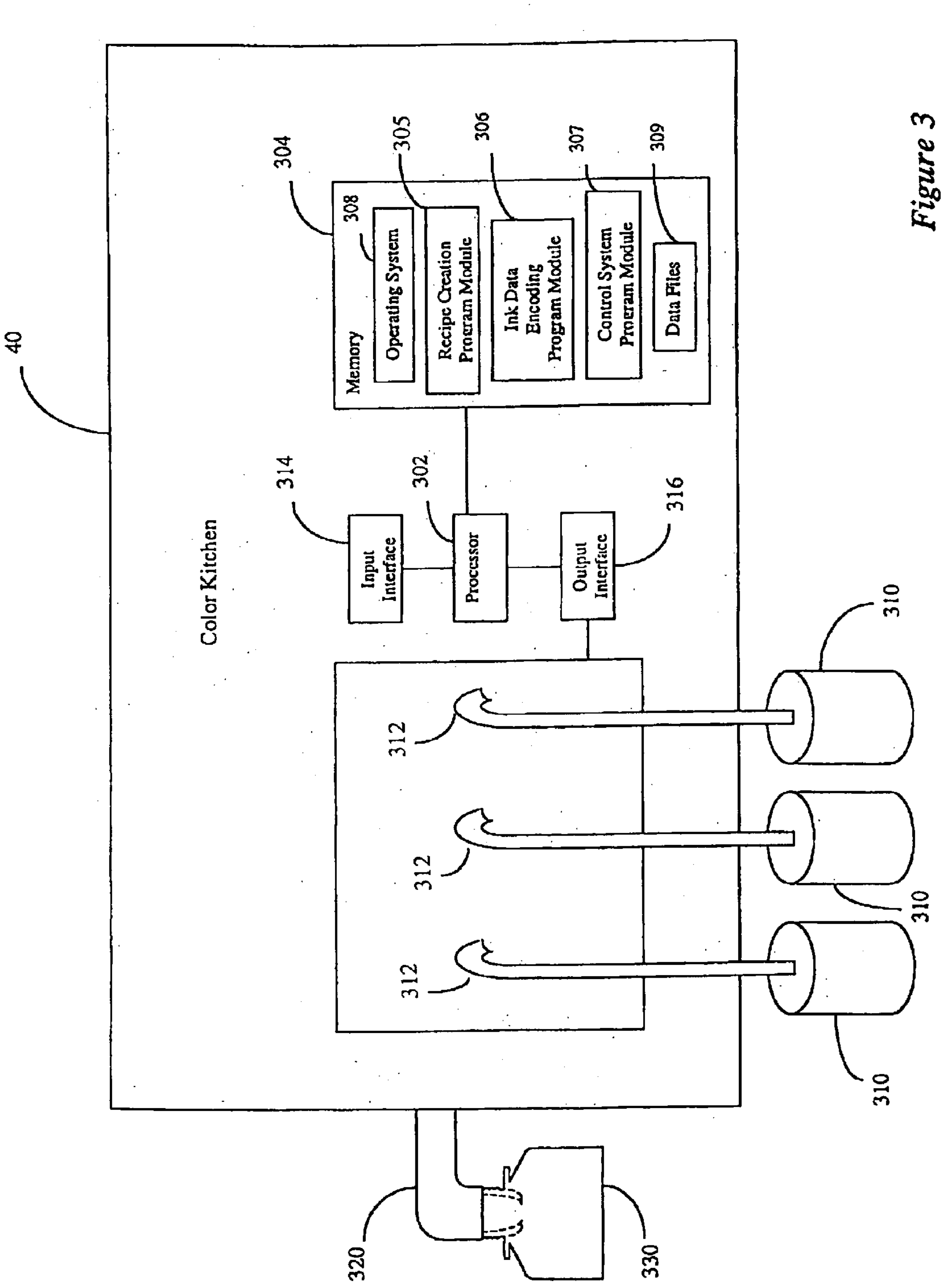
FIG. 3 is a functional block diagram illustrating an exemplary color kitchen in accordance with the present invention.

FIG. 3 shows a functional block diagram of an exemplary color kitchen 40 that is used in accordance with the present invention. The color kitchen 40 is used to mix purified dye stock solutions 30 and ink-jet additive 35 to provide a final ink-jettable ink, such as a spot color ink 60. The color kitchen 40 includes a plurality of feed reservoirs 310 which hold a number (e.g., 12) of the dye stock solutions 30 and also has extra reservoirs 310 containing the ink-jet additives and either water or solvent 35.

The exemplary color kitchen 40 is controlled by a computerized system generally comprising a processor 302 and a number of software program modules and data 309 stored in a memory 304 coupled to the processor 302. Program modules include routines, operating systems 308, application programs modules (such as Recipe Creation program module 305, Ink Data Encoding program module 306 and Control System program module 307), data structures, and other software or firmware components. Specifically, the Recipe Creation program module 305 comprises computer executable instructions for controlling the creation of the mixing recipes of dye stock solutions 30 and ink-jet additives 35. The Ink Data Encoding program module 306 comprises computer executable instructions for creating ink data and generating an output representing the ink data that may be encoded on a container 330 used to store the ink. As used herein, "ink data" refers to the amount and color of the ink that is contained in a container. The Ink Data Encoding program module 306 creates ink data for the spot color inks produced by the color kitchen 40, which will also be used in the ink-jet printing system 100. Also, the Control System program module 307 comprises computer executable instructions for controlling mid-level and low-level indicators on the feed reservoirs 310, which are operable to detect fluid levels. The processor 302 executes the computer-executable instructions of the various program modules described above.

The color kitchen 40 also includes one or more input interfaces 314 for communicating with and managing one or more input devices. An input device may comprise a keyboard, mouse, touch-screen, microphone, or other signal generating device, or another computer executing a program module, such as a computer aided design (CAD) program module 80. Thus, via an input interface 314, the color kitchen 40 may receive design data relating to a particular print design. As used herein, "design data" refers to information relating to the colors and quantities of inks required to print a design. Design data may also include information relating to the type, color and dimensions of the substrate on which the design will be printed. The colors to be printed in a design are referred to as either target colors or design colors. For purposes of the present invention, the terms "target colors" and "design colors" are used interchangeably. Design data may be stored in data files 309 in the memory 304 of the color kitchen 40. The Recipe Creation program module 305 may then process the design data to determine the identity and quantity of each dye stock solution 30 and the ink-jet additives 35 required to create a spot color ink 60 that matches a selected design color.

In processing the design data, the Recipe Creation program module 305 deconstructs the target colors into constituent mother colors, taking into account the color values of the selected mother colors and of the unprinted substrate. The color kitchen 40 may be capable of storing the characteristics of 1000 or more ink colors and their recipes in its memory. Recipe Creation program modules are well known in the art and are generally available off-the-shelf (i,e., Gretag MacBeth or DataColor). An output interface 316 allows the processor 302, controlled by the operating system 308 in conjunction with the Recipe Creation program module 305, to communicate with the mechanical components (not shown) of the color kitchen 40 in order to control the dispensing of appropriate amounts of dye stock solutions 30 and ink-jet additives 35 into the containers 330.

It is preferred that each purified stock solution be dispensed with an accuracy of plus or minus 0.01 grams when dispensing 5 grams or less, and plus or minus 0.02 grams at over 5 grams. The range of ink formulated per ink color can range from about 50 ml to tens of liters or more. The dispensed dye stock solutions 30 and additives 35 are then mixed in the container 330 or reservoir by mechanical agitation or other means. Although color kitchens are common in industries such as textiles, where printing takes place with traditional presses, the exemplary color kitchen 40 used for the method of ink-jet printing described herein is designed with unique capabilities. Such capabilities are in-line filtration of sub-micrometer particles; isolation of the dye stock solutions, additives and dispensed and mixed final inks from atmospheric contamination and debris; and automated encoding of the containers 330 or reservoirs with ink data that identifies the color and volume or weight of the contents and that may be communicated to an ink-jet printing system 100.

When formulating the ink-jet inks using the color kitchen 40, it is important to adjust the viscosity of the processing fluids used when making the final ink-jet inks. These fluids include the purified dye stock solutions 30, additives and water 35. If the viscosity of the ink is too low, splatter problems could develop when placing the ink into the ink container 330 using the color kitchen 40. Also, too low of a viscosity could result in the formation of small droplets in the container 330, which could also interfere with the printing process.

Conversely, if the viscosity of the ink-jet ink is too high, the ink will not flow through the in-line filters at an acceptable pressure drop. This would require the use of a pump having an unacceptably high output pressure. Accordingly, it is preferred to optimize the rheology of the various solutions which are dispensed in the color kitchen 40 to produce an ink-jet ink which does not splatter during dispensing into the ink-jet containers 330 while also flowing through the in-line filters at an acceptable pressure drop.

The color kitchen 40 also includes a plurality of tubes 312 which feed the purified stock solution 30, additives and water or solvent 35 from the reservoirs 310 to a plurality of dispensing nozzles 320. The dispensing nozzles 320 basically comprise the outlets from the plurality of tubes 312. Then, as each ink is formulated, the necessary purified stock solutions 30, additives and water or solvent 35 are fed from the reservoirs 310, through the tubes 312 and out from the nozzles 320 into the container 330.

Recirculation means (not shown) may be provided to ensure that the contents of the reservoirs 310 are maintained in a homogeneous state to ensure a uniform concentration. If recirculation means are used, these means will preferably include a recirculation pump that removes a solution from one of the reservoirs 310, pumps it through a filter (not shown) and returns it to its reservoir 310. Preferably, the return solution is returned to the reservoir 310 at a location such that it is not immediately pulled back into the recirculation line. Preferably, the return solution is allowed to mix into the contents of the reservoir 310 to help ensure that the contents of the reservoir 310 are at a substantially uniform concentration and that the contents have a substantially consistent residence time prior to being used.

If the return line is located at the top of the reservoir 310, possible foaming could occur. Foaming would occur if the liquid level in the reservoir 310 dropped below the level of the return line, thereby creating a spatial gap. Then, as the return solution is placed into the reservoir 310, the spatial gap would cause foaming as the return solution contacted the contents of the reservoir 310. This foaming would result in the contents of the reservoir 310 not being at a substantially uniform concentration.

Conversely, if the return line is located at the bottom of the reservoir 310, possible "short circuiting" could occur as the return liquid is immediately drawn out of the outlet, resulting in an extended residence time for the remainder of the contents in the reservoir 310. Accordingly, unique design considerations should be taken into account if recirculation means are used.

Preferably, the color kitchen 40 also includes a control system which includes the previously mentioned mid-level and low-level indicators (not shown) on the feed reservoirs 310. These indicators will alert the operator when the level of a fluid reaches a point whereby more fluid may be added. Additionally, if the fluid level of any reservoir 310 gets too low, the control system may be designed to warn the operator that fluid must be added and/or that the color kitchen 40 must be automatically shut down, thereby preventing waste caused from producing ink-jet dyes that do not have the correct formulation. As mentioned, operation of the control system is controlled by the Control System program module 307.

Figure 4A:
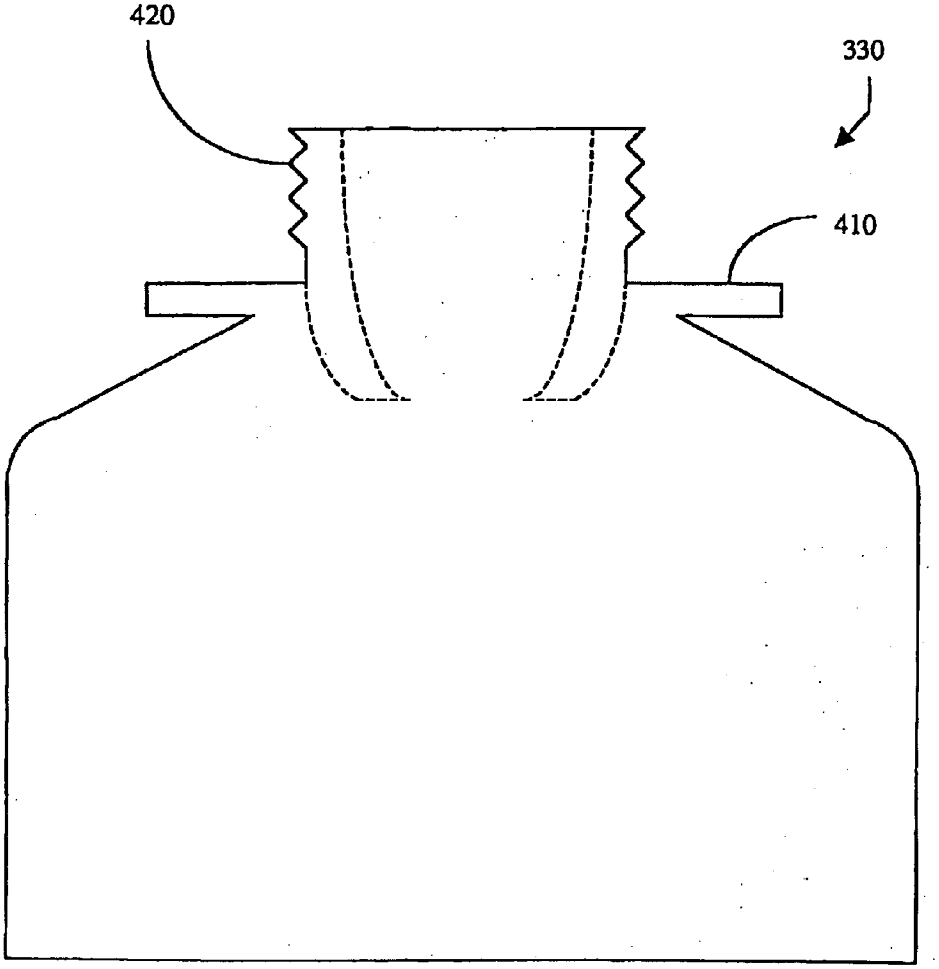
FIGS. 4*a* and 4*b* show a side view and a top view, respectively, of a container useful in the present invention.
Figure 4B:
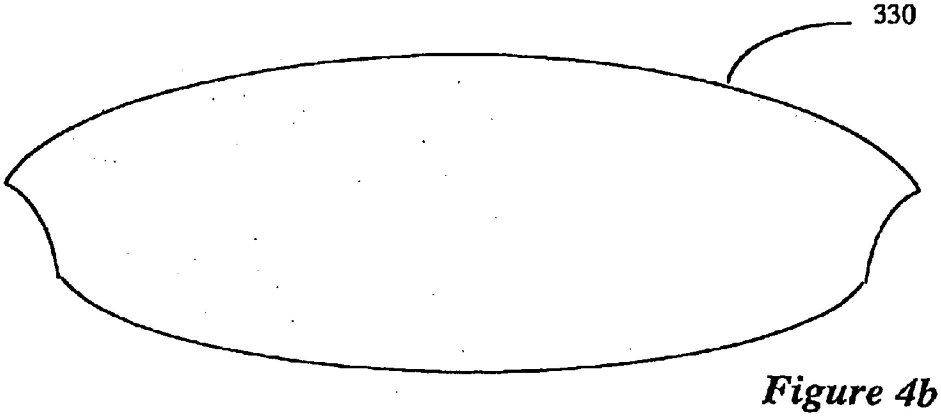

The containers 330 into which the ink-jettable inks are dispensed are preferably designed to ensure that no contamination occurs. As shown in FIG. 4*a*, the container 330 is designed with a grip 410 which is preferably located near the color kitchen nozzle 320. The containers 330 are preferably collapsible, as shown in FIG. 4*b*, but will expand as they are filled. As already discussed, preferably these containers 330 comprise collapsible pouches into which the ink-jet inks are dispensed.

By using collapsible pouches, the same size pouch can be used for a wide range of ink volumes since the amounts of each ink will depend on the requirements of the selected pattern. In addition, the collapsible pouches help reduce the amount of air contacting the inks when they are fed to the printer, thereby minimizing foaming and the necessity to de-gas the ink within the printer's feed system.

Figure 5:
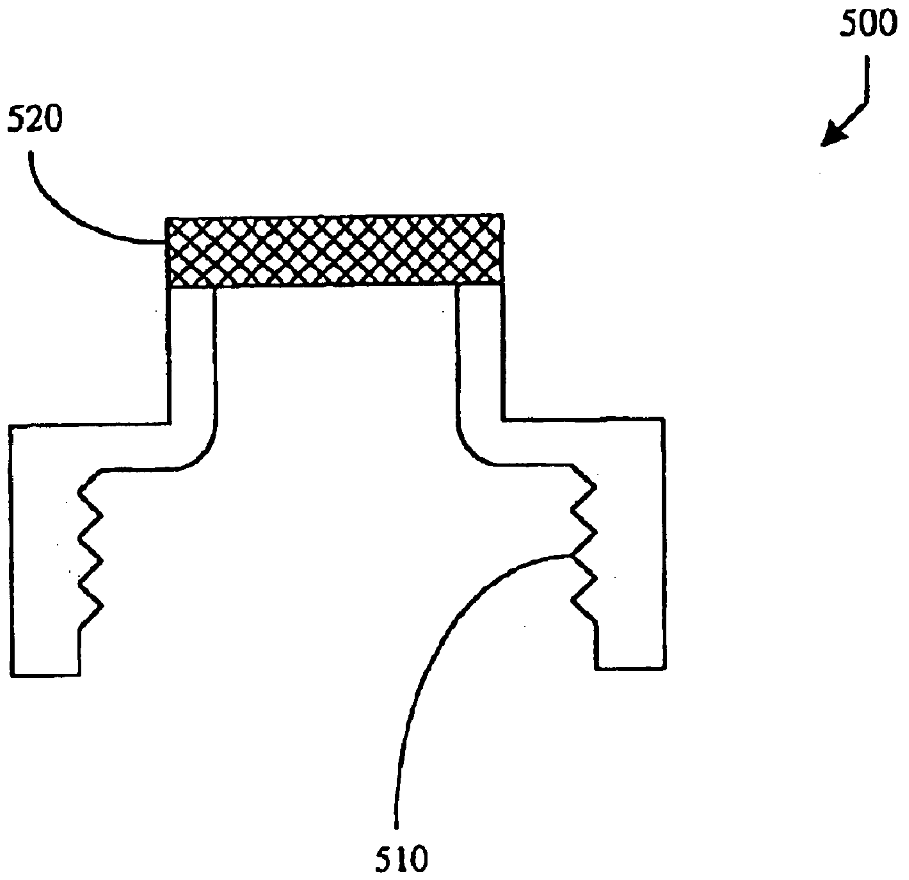
FIG. 5 shows a cap/adapter useful in the present invention.

Also, as shown in FIG. 5, preferably the containers 330 are designed to have cap/adapters 500 that can readily receive dispensed ink components, while also later being able to be connected directly to the ink-jet printing system 100. Accordingly, one the ink is dispensed into the container 330 by the color kitchen 40, these containers 330 may be loaded directly onto an ink-jet printing system 100. These cap/adapters 500 include threads 510 which correspond to the threads 420 on the container 330. Additionally, the cap/adapter 500 includes a rubber septum 520 which seals the container 330 and prevents air from entering and water from expiring from the container 330. Preferably, the cap/adapter 500 is designed such that when handtightened onto the container 330, there will be no leaks.

Figure 6:
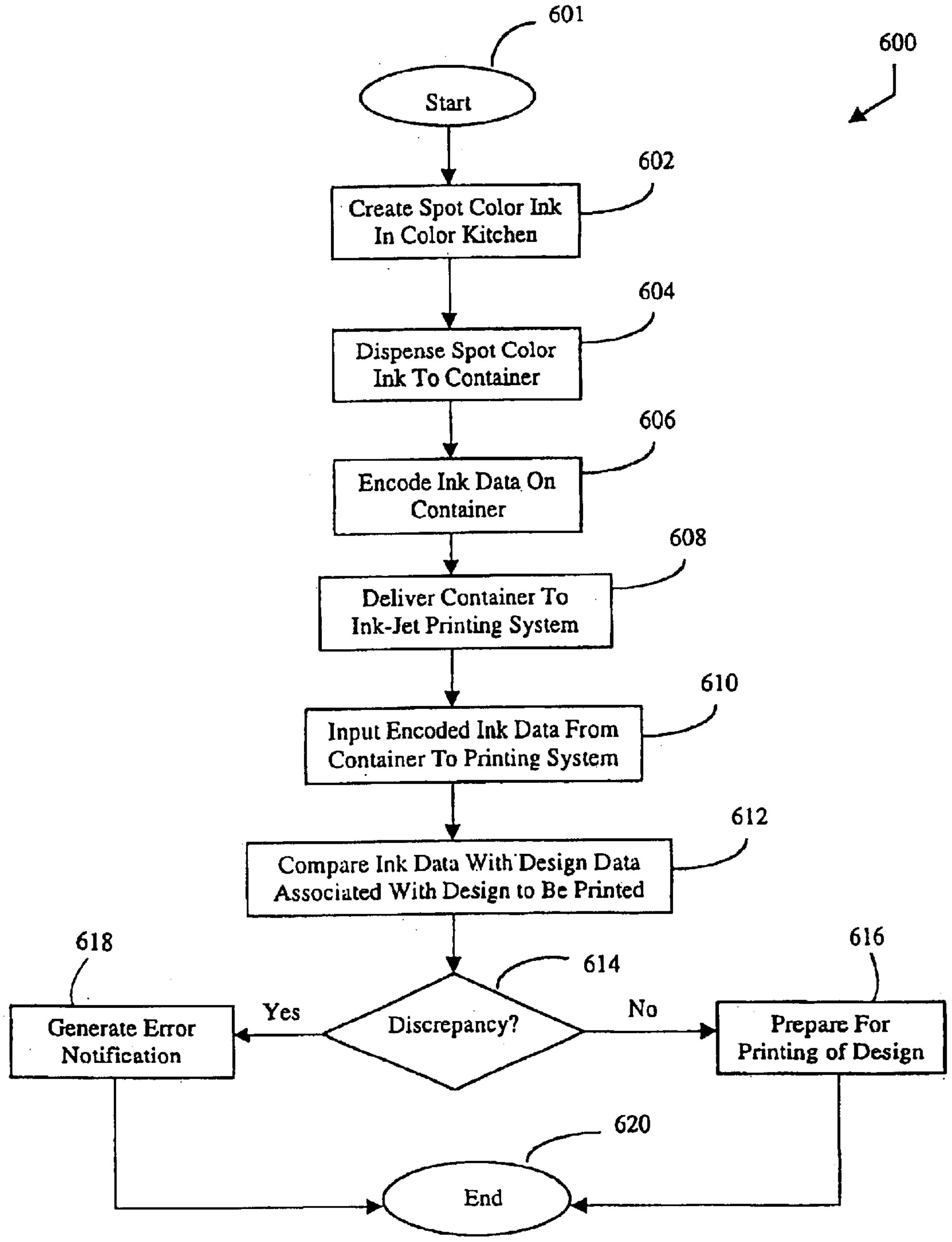
FIG. 6 is a flow chart illustrating an exemplary quality control method in accordance with the present invention.

FIG. 6 is a flow chart illustrating an exemplary quality control method 600 used in accordance with the present invention. The exemplary method 600 begins at starting block 601 and progresses to step 602, where an spot color ink-jet ink is created at a color kitchen 40. At step 604, the spot color ink is placed in a container 330 by the color kitchen 40, as previously described. Next, at step 606 the container 330 storing the spot color ink is encoded with ink data. Ink data may be generated by a component of the color kitchen 40, such as the exemplary Ink Data Encoding program module 306 described above. Those skilled in the art will appreciate that the Ink Data Encoding program module 306, or an equivalent thereof, may also be executed by a distinct system, such as a desktop, laptop, or handheld computer system, that is in communication with and operated in conjunction with the color kitchen 40. Alternately, ink data may be created manually by the operator of the color kitchen.

The Ink Data Encoding program module 306 may interact with the Recipe Creation program module 305 to determine a color reference, such as an LAB value, for the ink-jet ink. The Ink Data Encoding program 306 may then generate an encoded output, such as a bar code or a digital representation of the ink data. The encoded output may be encoded on the container 330 that stores the spot color ink. Encoding the ink data, or a representation thereof, on the container 330 may comprise affixing a bar code to the container 330, such as by way of a printed label, or storing digital data in a computer-readable memory device attached to the container 330. Those skilled in the art will appreciate that suitable computer-readable memory devices include RAM, ROM, EPROM, EEPROM, flash memory cards, digital video disks, Bernoulli cartridges, and the like. Still, any type of computer chip including a memory may be affixed to, or otherwise associated with, the container 330.

Those skilled in the art will also recognize that the color kitchen 40, or other system for generating the ink data, will include an appropriate output device, such as a printer or a data communication device, for encoding the ink data on the container 330. For example, a printer may be used to print a bar code label, which may be manually attached to the container 330. Alternately, the Ink Data Encoding program module 306 may be programmed to interact with a data communication device in order to automatically transfer digital ink data to a computer readable memory device associated with the container 330, via a data communications link. Other methods and systems for encoding ink data on the container 330, such as by stamping or melting a code onto the surface of the container 330, may be contemplated by those skilled in the art. Such other methods for encoding ink data onto the container 330 are considered to be within the spirit and scope of the present invention.

After the ink data is encoded on the container 330, the exemplary method 600 continues at step 608, where the container 330 is delivered to the inkjet printing system 100. The color kitchen 40 may be remotely located from the ink-jet printing system 100, requiring that the containers be delivered to the ink-jet printing system 100 by freight or some other transport method. Preferably, however, the color kitchen 40 may be situated in the same location as the ink-jet printing system 100. As mentioned, proximity of the color kitchen 40 and the ink-jet printing system 100 allows production of ink-jet inks having short-term stability, which have significantly reduced development times and costs.

At step 610, the ink data from the container 330 is input to the ink-jet system 100. Ink data may be input to the inkjet printing system 100 in a variety of well-known ways. For example, if the ink data is encoded on the container 330 by way of a bar code, a conventional bar code reader may be coupled to the ink-jet printing system 100 as an input device. Alternately, if the ink data is encoded on the container 330 by way of a computer readable medium, an appropriate input device for reading the ink data may be coupled to the ink-jet printing system 100. Appropriate input devices for reading ink data may comprise optical memory reading devices, magnetic memory reading devices, and the like. Furthermore, ink data may be input into the ink-jet printing system 100 by way of a keyboard, a touch screen, a mouse, a voice recognition unit including a microphone, or any other input device.

Ink data that is input to the ink-jet printing system 100 is stored in a data file 111 in the memory 112 of the ink-jet system 100 (see FIG. 1). The memory 112 may also store various program modules, such as an operating system 114, a Hybrid Color Management program module 90, a Quality Control program module 116, and any other program module required to control or optimize the ink-jet printing system 100. The memory 112 is coupled to a processor 120 that executes the computer-executable instructions of the described program modules. The processor 112 is also coupled to an input interface 122 for communicating with and managing various input devices and an output interface 124 for communicating with and managing various output devices. Output devices coupled to the ink-jet printing system 100 may include: a printer, such as an ink-jet printer, a dot matrix printer, a laser printer, and any other printing device; a display device; an audio device, such as a speaker, or an alarm; a light emitting device; and the like.

Data files 111 stored in the memory 112 of the inkjet printing system 100 may also comprise design data relating to the target colors and quantities of inks required for a particular design to be printed. Design data may be input to the ink-jet printing system by way of any of the above-described input devices, or may be otherwise downloaded from a remote computer system. At step 612 the exemplary quality control method 600 compares the ink data from the container 330 with the design data to determine if any discrepancies exist between the spot color ink stored in the container 330 and a selected design color.

The comparison of ink data with design data may be performed by the Quality Control program module 116. Generally, the ink data comprises a color reference, such as a LAB value for the spot color ink, and an indication of the quantity ink in the container 330. The design data comprises information relating to the shape of the design and target color references, such as LAB values, for the target colors of the design. Design data may further comprise information relating to the printing mode to be used for printing the design and the type, dimensions and color value of the substrate on which the design is to be printed. Accordingly, the design data may be used to ensure that a spot color ink matches a selected design color and that there is a sufficient amount of the spot color ink required to print the design color.

The Quality Control program module 116 may thus comprise computer-executable instructions for examining the ink data to determine if selected target colors of the design can be reached (matched) by the spot color inks in the containers 330 and if enough ink is stored in the containers 330 to complete the design. In a spot color printing process, the determination as to whether the target colors can be reached involves comparing the color reference of the ink data from a single container 330 to the color reference of the selected target color. If the color reference of the ink data matches the color reference of the target color or differs from the color reference of the target color by less than a predetermined value, the target color will be considered to be reached by the spot color ink in the container 330.

Returning to the description of FIG. 6, the exemplary method 600 continues at step 614 with a determination as to whether a discrepancy exists between the ink data and the design data. If no discrepancy exists, the method 600 continues to step 616, where the ink-jet printing system 100 prepares for printing of the design. However, if a discrepancy exists, the method 600 proceeds to step 618, where an error notification is generated.

As mentioned, the discrepancy may indicate that a selected target color of the design cannot be reached using a spot color ink stored in a containers 330 and/or that the quantity of a spot color ink stored in a container 330 is insufficient to properly print the design on the dimensions of the substrate. The discrepancy may also indicate that a spot color ink container has not been loaded into the proper location in the ink-jet printing system 100. In addition, as previously mentioned, process color inks are typically purchased as off-the-shelf items. Process color ink containers may also be encoded with ink data. Ink data from process color ink containers may be used in the exemplary quality control method to ensure that the proper process color inks are loaded into the proper locations in the ink-jet printing system 100.

The error message generated at step 618 will communicate information about the discrepancy to the operator or user of the ink-jet printing system 100. The error message may be an audible alarm, a message printed on paper or displayed on a display device, or a display of the design showing how the design will appear if printed with the inks presently loaded onto the inkjet printing system 100. Other methods for generating an error message will occur to those of ordinary skill in the art and are therefore considered to be within the scope of the present invention. An error message may thus alert the user that a new spot color ink must be created in the color kitchen 40 or that the process color inks have been improperly loaded into the ink-jet printer. Subsequent to generating an error message at step 618 or preparing for printing of the design at step 616, the exemplary method 600 ends at step 620.

As mentioned, a unique feature of the ink-jet printing system 100 of the present invention is its ability to print in a hybrid color mode, using a hybrid color set. A hybrid color set comprises both spot color inks and process color inks. In an exemplary embodiment, the inventive hybrid printing functionality is provided by a Hybrid Color Management program module 90 (see FIG. 1*b*). The Hybrid Color Management program module 90 enables the printer to print a greater number of colors than the number of inks that are loaded onto the ink-jet printing system 100. Thus, the Hybrid Color Management program module 90 permits hybrid ink-jet printing of a wide range of fabrics with colors that may be made to match those produced by production screen processes.

Conventional ink-jet printing systems are configured to print in a process color printing mode. Most commercially available color ink-jet printing systems print only four colors simultaneously. Some higher end ink-jet printing systems are capable of printing six or even eight colors simultaneously. Accordingly, prior art ink-jet printing systems were able to print up to a maximum of eight colors, or to print a range of process colors by combining up to eight ink colors. If such printers were configured to print in spot color mode, only eight spot colors could be achieved.

Many textile designs require greater than eight colors, which would require various substitutions of ink colors in an inkjet printing system having only eight available spot color inks. Also, process color printing has a limited color gamut determined by the color values of the printed process colors. If a target color cannot be reached by combination of the process colors in a particular process color set, a spot color mode must be adopted. However, the Hybrid Color Management program module 90 of the present invention overcomes the limitations of both spot color mode and process color mode printing.

Generally described, the Hybrid Color Management program module 90 facilitates a method whereby a user selects important or dominant design colors that may be dispensed by the color kitchen 40, as described above. When the design is printed, the important or dominant colors will be printed using a spot color mode. The less dominant design colors will be printed in a process color mode. Using a plurality of process colors in combination with themselves and/or with the spot colors, the Hybrid Color Management program module 90 will assist the user in selecting the color combinations needed to optimize color matching of the less-dominant design colors.

For example, with an eight color hybrid printing system that is to print a 16 color design, the user might select four ink colors as spot color inks to print the most important or dominant four design colors. Then the Hybrid Color Management program module 90 would be used to select four process ink colors, which when used in a process color printing mode in combination with each other and possibly with the four selected spot color inks, would provide optimum color matching of the 12 remaining design colors.

Before the Hybrid Color Management program module 90 is employed to determine a hybrid ink-jet ink color set, the design must be prepared for printing and the target colors of the design must be determined. Typically, a textile design is brought into digital form using CAD program modules 80. After a design is brought into digital form, color separations are prepared. These separation files (one per color) can be used to drive a digital proofing printer.

In the course of the textile printing company's preparation of screens for production, separation files are typically modified by an expert in order to prepare them for driving digital screen engraving systems. These modifications take into account the selected screen mesh and type of screen (lacquer or galvano). Then, if a design color is to be printed at various intensities (gray scale), the engraving expert alters the separation files to provide desired visual effects. Although the work of the engraving expert does not effect color matching, the result does effect the appearance of the design.

Textile printing companies may proof either the just-separated design files or the separation files that have been modified by the engraving expert, following a step known as "colonizing." Those skilled in the art will appreciate that proofing of the modified separation files will provide a closer match to the appearance of the production print. Separation files are colorized by a specialist who defines the target colors to be printed. Each textile printing company has a library of colors that are selected for each color field or a new color not in the library may be created for the design.

Usually, a design is prepared with more than one colorway, i.e., the same pattern with different design colors. The specialist uses calibrated monitors to visualize each colorway. Proof printing takes place after the colorways are prepared. When the color specialist is satisfied with the proof printing, design data is collected regarding the target colors for each colorway. Design data is later supplemented with information relating to the color, type and dimensions of the substrate on which the design will be printed, the printing mode that will be used to print the design, the dimensions of the design to be printed, etc.

Figure 7:
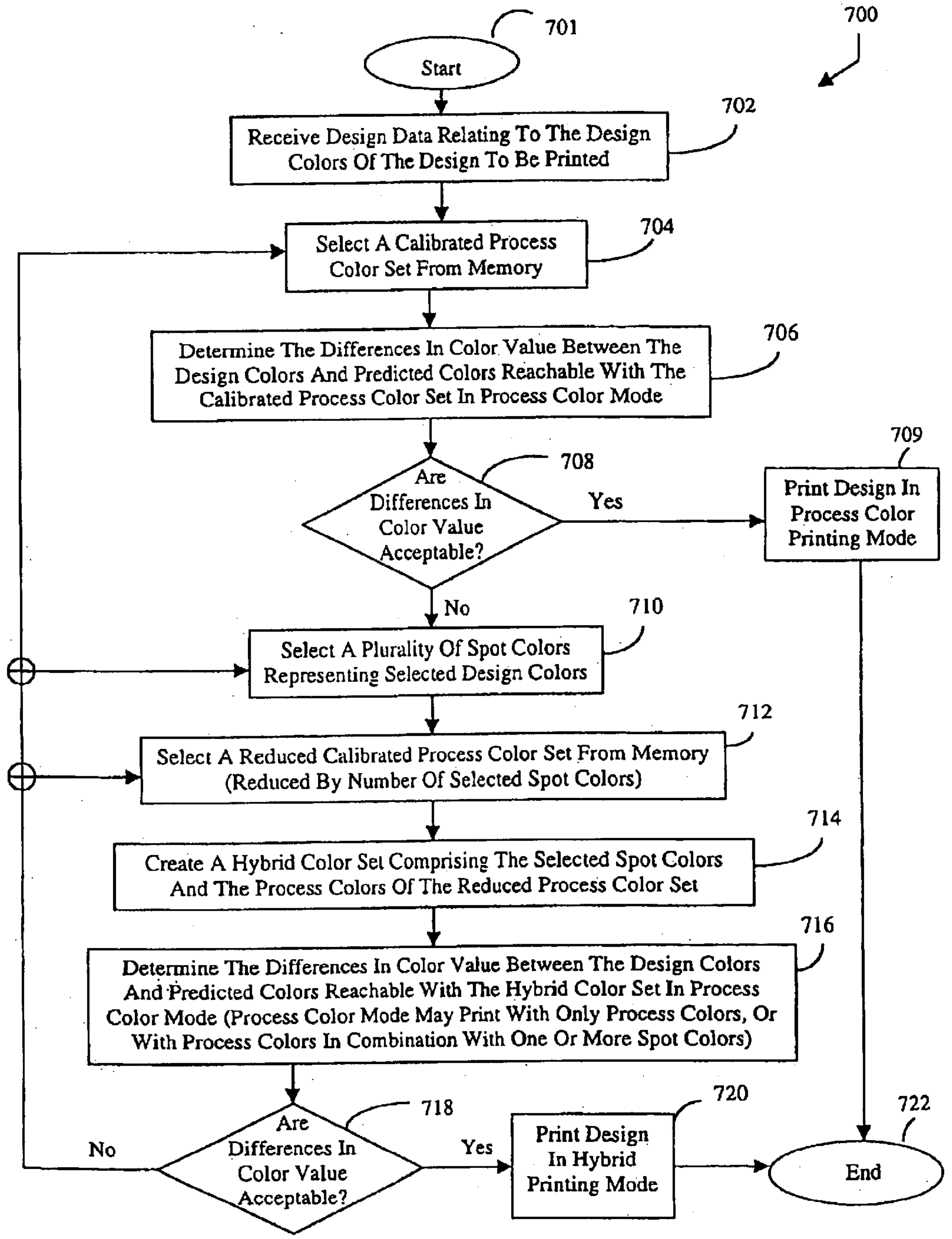
FIG. 7 is a flowchart that illustrates an exemplary hybrid color management method of the present invention.

After the design data for each selected colorway is input to the memory 112 of the ink-jet printing system 100, the Hybrid Color Management program module 90 may be executed to assist the user in making decisions about what ink colors are needed to print the design. The method performed by the Hybrid Color Management program module 90 is generally illustrated in the flowchart of FIG. 7. The exemplary method 700 begins at starting block 701 and progresses to step 702, where the design data relating to the target colors of the design is received from memory.

Next at step 704, a calibrated process color set is selected. Although a calibrated process color set may be selected automatically via software routines, it is preferable that a color expert manually select a calibrated process color set based his/her expertise. The memory 112 of the ink-jet printing system 100 will preferably store a number of calibrated process color sets. Calibration of a process color set is well known in the art and generally involves a process whereby each primary color in the process color set is printed in approximately twenty different intensities. For each printed intensity, a LAB color value is measured using a spectrophotometer. After the LAB values of the primary colors are measured, approximately one hundred to several hundreds of sample colors are printed and the LAB value for each sample color is measured. Finally, the difference in color value between each sample color and a corresponding primary color is calculated. This difference in color value is typically expressed as a "ΔE" value, which represents a distance between colors in color space. Based on the sample colors, colors may be predicted that are reachable using the process colors in the calibrated process color set in a process color printing mode. The concepts of color space, LAB values and ΔE values are well known to those skilled in the art and will therefore not be further described herein.

Once a calibrated process color set is selected, the exemplary method 700 advances to step 706, where the differences in color value are determined between the design colors and the predicted colors reachable with the calibrated process color set in a process printing mode. Preferably, the determination of the differences in color values involves calculations of ΔE values. However, in an alternate embodiment, this determination may be made through visual inspection and comparison of the predicted colors and the design colors on a display device. If, at step 708, the differences in color values between the design colors and the predicted colors is acceptable to the user (color expert), the method advances to step 709, where the design is printed using the calibrated process color set in a process color mode. However, if the differences in color values between the design colors and the predicted colors is not acceptable, the method progresses to step 710, where a plurality of spot colors are selected.

The spot colors may correspond to selected design colors, such as dominant or important target colors of the design. Again, selection of spot colors is preferably performed by a color expert based on expertise. By way of example, if a 16-color design is to be printed with an eight color ink-jet printer, the color expert may employ his or her color knowledge to determine how many and which design colors should be printed as spot colors. There will typically be the tendency to choose as spot colors the design colors that cover most of the fabric surface, since these colors have the most visual impact. Usually, the four most dominant design colors cover at least 60% of the surface.

Once a number of spot colors are selected, a reduced calibrated process color set is selected at step 712. A reduced calibrated process color set includes the number of process colors as the original calibrated process color set (from step 704) reduced by the number of selected spot colors. Thus, if the original calibrated process color set included eight process colors and two spot colors were selected, the reduced calibrated process color set will include six process colors. A number of reduced calibrated process color sets may be stored in memory. Reduced calibrated process color sets are calibrated in the manner described above.

At step 714, a hybrid color set is created that comprises the process colors of the reduced calibrated process color set and the selected spot colors. Then, at step 716, the differences in color values are determined between the design colors and the predicted colors reachable with the hybrid color set in a process color printing mode. Using the hybrid color set in a process color printing mode may entail using only the process colors in the process color printing mode, or using the process colors in combination with one or more spot colors in the process printing mode. Those skilled in the art will appreciate that the predicted colors that are reachable in the process printing mode using only the process colors may be determined based on information relating to the reduced calibrated process color set. Those skilled in the art will also appreciate that the predicted colors that are reachable in the process printing mode using a combination of process colors and spot colors may be determined based on mathematical calculation and compensation of the information relating to the reduced calibrated process color set.

Again, the determination of the differences in color values preferably involves calculations of ΔE values. In a preferred embodiment of the present invention, ΔE values are displayed to the user of the ink-jet printing system via a display device. In this manner, the user may decide whether the difference between each printable color and the corresponding design color is significant enough as to be unacceptable. Of course, the decision as to whether a color value difference is unacceptable may be automated. For example, it is generally accepted in the art that a ΔE value greater than 3 translates into a visibly noticeable difference in color. Therefore, an automated decision may be made such that all ΔE values greater than 3 are considered to be unacceptable.

However, it is preferable to allow the user to control this decision because cost or time constraints or other external factors may dictate that a ΔE value of greater than 3 should be considered acceptable. Furthermore, it is also advantageous to provide the user with a display of the design as it would appear if printed with the hybrid color set. The user (color expert) may thus inspect the predicted design colors with the consequent errors side by side with the target design colors.

If at step 718 it is determined that the differences in color values between the design colors and the predicted colors reachable with the hybrid color set are acceptable, the design is printed in the hybrid color printing mode at step 720. Again, printing in the hybrid color mode involves printing selected design colors in spot color mode and printing the remaining design colors in process color mode.

If at step 718 it is determined that the differences in color values between the design colors and the predicted colors are not acceptable, the method may return to either step 704, where another calibrated process color set may be selected, to step 710, where additional or other spot colors may be selected, or to step 712, where another reduced calibrated process color set may be selected. The determination of whether to return to step 704, 710, or 712 is preferably made by the color expert based on his/her color expertise. The method 700 is then repeated from either step 704, 710, or 712, as described above, until the design is printed in a process color mode at step 709 or until the design is printed in a hybrid color mode at step 720. Subsequent to the design being printed, the exemplary method 700 ends at step 722.

The exemplary hybrid printing method described above makes reference to the fact that a hybrid color set includes spot colors, as well process colors from a calibrated process color set. In accordance with an alternate embodiment of the present invention, a hybrid color set may be comprised entirely of spot colors. Any or all of the ink colors included in the hybrid color set may be used for printing in a spot color mode. In addition, any number of the spot colors in the hybrid color set may be combined in a process color printing mode to produce a gamut of printed colors.

As mentioned, printing of the design may first involve a proofing step. When the hybrid color set is loaded onto the inkjet printing system 100, a small amount of material (perhaps one repeat) may be printed and reviewed by the textile printing company's colorist, studio designer and/or customer. The reviewer may request that one or more design colors be slightly modified. In that case, a new color kitchen recipe may be created (determined by textile printing company staff off-line) for a new spot color. The new spot color would be characterized by a new color reference value, which would be encoded on its container as ink data. The new spot color would be added to the hybrid color set as a replacement for either a process color or a spot color. The design data for the design to be printed would also be updated with the new color reference information.

With the new hybrid color set and new design data, the Hybrid Color Management program module 90 would be employed to recalculate all process color tolerances and display the design as it would appear with the modified color. Also, the Hybrid Color Management program module 90 would reselect the process colors that would provide optimum color matching, taking into account the new spot color. Once proofing is complete, the ink-jet printing system 100 may be used to deposit the inks onto a fabric or other substrate, which is fed through the ink-jet system by conventional means.

While much of the description of the present invention has been directed to textile manufacturing, the present invention may also be used in other industries and with other substrates, such as wall coverings, floor coverings, signage, packaging materials, and labels. For example, as has been discussed previously, currently ink-jet printing systems are used to produce process color when printing color copies of documents. However, these copies are limited in quality and color based upon the lack of ink-jettable colors available for process color. However, by using the color kitchen and the Hybrid Spot/Process Color Management Program module discussed, the present invention is capable of generating hundreds of different colors of ink-jettable inks and, in combination with the hybrid color program module, can use these inks to accurately match thousands of different colors, thereby significantly increasing the usefulness and range of today's digital printers. Additionally, as printer technology increases further, to increase the number of ink-jet nozzles used, even more colors can be reproduced, thereby increasing the versatility of the present invention in all areas of color printing.

What is claimed is:

1. A hybrid printing method for digitally printing a design having a selected design color and a plurality of remaining design colors, comprising:

selecting a spot color representing the selected design color;

selecting a calibrated process color set comprising a plurality of process colors;

creating a hybrid color set comprising the spot color and the processes colors;

determining whether the remaining design colors can be reached using the hybrid color set in a process color printing mode; and if the remaining design colors can be reached, printing the design using the hybrid color set, wherein the spot color is used to print the selected design color in a spot color printing mode and wherein the hybrid color set is used to print the remaining design colors in the process color printing mode.

2. The method of claim 1, wherein determining whether the remaining design colors can be reached using the hybrid color set in a process color printing mode comprises:

determining a plurality of predicted colors that can be reached using the hybrid color set in the process printing mode, the predicted colors substantially matching the remaining design colors; and determining whether the differences between the predicted colors and the remaining design colors are acceptable.

3. The method of claim 2, wherein determining the plurality of predicted colors that can be reached using the hybrid color set in the process printing mode comprises:

determining the plurality of predicted colors that can be reached using the process colors in the process printing mode.

4. The method of claim 2, wherein determining the plurality of predicted colors that can be reached using the hybrid color set in the process printing mode comprises:

determining the plurality of predicted colors that can be reached using the process colors in combination with the spot color in the process printing mode.

5. The method of claim 2, wherein determining whether the differences between the predicted colors and the remaining design colors are acceptable comprises:

calculating a difference in LAB value between each the predicted color and the each corresponding remaining design color; and determining whether each difference in the LAB value is acceptable.

6. The method of claim 5, wherein determining whether the difference in the LAB values is acceptable comprises determining whether each difference in the LAB values is less than a predetermined value.

7. A computer readable medium having stored thereon computer executable instructions for performing the method of claim 5.

8. The method of claim 1, wherein determining whether the remaining design colors can be reached using the hybrid color set in a process color printing mode is performed by the user through visual inspection of a display representing the design as it would appear if printed using the hybrid color set in a process color printing mode.

9. A computer readable medium having stored thereon computer executable instructions for performing the method of claim 1.

10. The method of claim 1, further comprising:

if the remaining design colors cannot be reached using the hybrid color set in a process color printing mode, selecting a second calibrated process color set comprising a plurality of second process colors;

creating a second hybrid color set comprising the spot color and the second processes colors;

determining whether the remaining design colors can be reached using the second hybrid color set in the process color printing mode; and if the remaining design colors can be reached, printing the design using the second hybrid color set, wherein the spot color is used to print the selected design color in the spot color printing mode and wherein the second hybrid color set is used to print the remaining design colors in the process color printing mode.

11. A computer readable medium having stored thereon computer executable instructions for performing the method of claim 10.

12. The method of claim 1, further comprising:

if the remaining design colors cannot be reached using the hybrid color set in a process color printing mode, selecting a second spot color;

selecting a second calibrated process color set comprising a plurality of second process colors;

creating a second hybrid color set comprising the second spot color and the second processes colors;

determining whether the remaining design colors can be reached using the second hybrid color set in the process color printing mode; and if the remaining design colors can be reached, printing the design using the second hybrid color set, wherein the second spot color is used to print the selected design color in the spot color printing mode and wherein the second hybrid color set is used to print the remaining design colors in the process color printing mode.

13. The method of claim 1, further comprising:

if the remaining design colors cannot be reached using the hybrid color set in a process color printing mode, selecting a second spot color;

creating a second hybrid color set comprising the second spot color and the processes colors;

determining whether the remaining design colors can be reached using the second hybrid color set in the process color printing mode; and if the remaining design colors can be reached, printing the design using the second hybrid color set, wherein the second spot color is used to print the selected design color in the spot color printing mode and wherein the second hybrid color set is used to print the remaining design colors in the process color printing mode.

14. The method of claim 1, further comprising:

if the remaining design colors cannot be reached using the hybrid color set in a process color printing mode, selecting a second selected design color for the design;

selecting a second spot color;

selecting a second calibrated process color set comprising a plurality of second process colors;

creating a second hybrid color set comprising the spot color, the second spot color and the second processes colors;

determining whether the remaining design colors can be reached using the second hybrid color set in the process color printing mode; and if the remaining design colors can be reached, printing the design using the second hybrid color set, wherein the spot color is used to print the selected design color in the spot color printing mode, wherein the second spot color is used to print the second selected design color in the spot color printing mode, and wherein the second hybrid color set is used to print the remaining design colors in the process color printing mode.

15. A hybrid printing method for digitally printing a design having a selected design color and a plurality of remaining design colors, comprising:

selecting a plurality of spot colors;

determining whether the remaining design colors can be reached using the spot colors in a process color printing mode; and if the remaining design colors can be reached, printing the design using the spot colors, wherein one of the spot colors is used to print the selected design color in a spot color printing mode and wherein a combination of the spot colors is used to print the remaining design colors in the process color printing mode.

16. A computer readable medium having stored thereon computer executable instructions for performing the method of claim 15.

17. The method of claim 15, wherein determining whether the remaining design colors can be reached using the spot colors in a process color printing mode is performed by the user through visual inspection of a display representing the design as it would appear if printed using the combination of the spot colors in the process color printing mode.

18. A hybrid printing method for digitally printing a design having a selected design color and a plurality of remaining design colors, comprising:

selecting a calibrated process color set comprising a plurality of process colors;

determining whether the selected design color and the remaining design colors can be reached using the process colors in a process color printing mode; and if the selected design color and the remaining design colors can be reached using the process colors in a process color printing mode, printing the design in the process color printing mode using the process color;

if the selected design color and the remaining design colors cannot be reached using the process colors in a process color printing mode:

selecting a spot color representing the selected design color;

selecting a second calibrated process color set comprising a plurality of second process colors, creating a hybrid color set comprising the spot color and the second processes colors, determining whether the remaining design colors can be reached using the hybrid color set in a process color printing mode, and if the remaining design colors can be reached using the hybrid color set in a process color printing mode, printing the design using the hybrid color set, wherein the spot color is used to print the selected design color in a spot color printing mode and wherein the hybrid color set is used to print the remaining design colors in the process color printing mode.

19. The method of claim 18, wherein determining whether the remaining design colors can be reached using the hybrid color set in the process color printing mode comprises:

determining a plurality of predicted colors that can be reached using the hybrid color set in the process printing mode, the predicted colors substantially matching the remaining design colors;

determining whether the differences between the predicted colors and the remaining design colors are acceptable.

20. The method of claim 19, wherein determining the plurality of predicted colors that can be reached using the hybrid color set in the process printing mode comprises:

determining the plurality of predicted colors that can be reached using the second process colors in the process printing mode.

21. The method of claim 19, wherein determining the plurality of predicted colors that can be reached using the hybrid color set in the process printing mode comprises:

determining the plurality of predicted colors that can be reached using the second process colors in combination with the spot color in the process printing mode.

* * * * *